No. 643,669. Patented Feb. 20, 1900.
H. MARTY.
ANIMAL TRAP.
(Application filed Dec. 28, 1897.)
(No Model.)
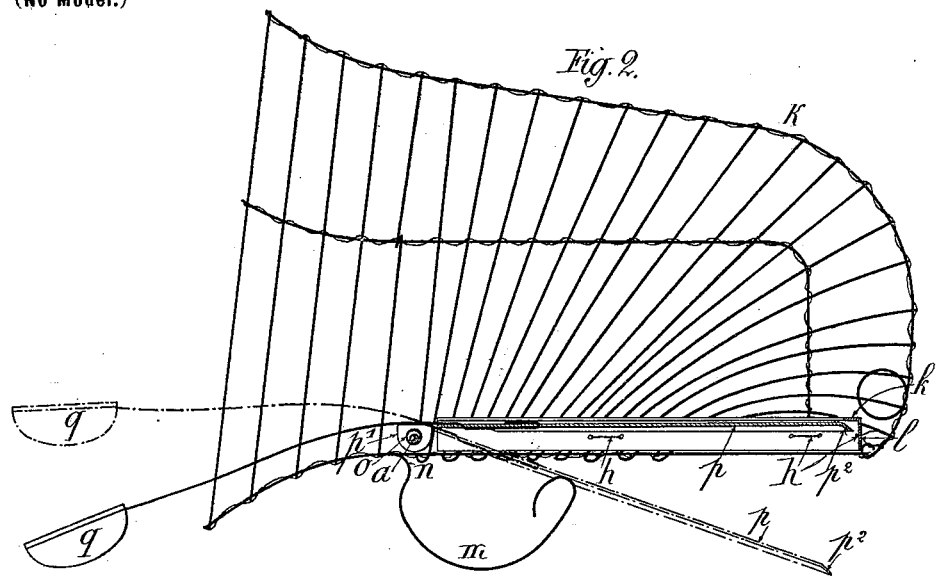
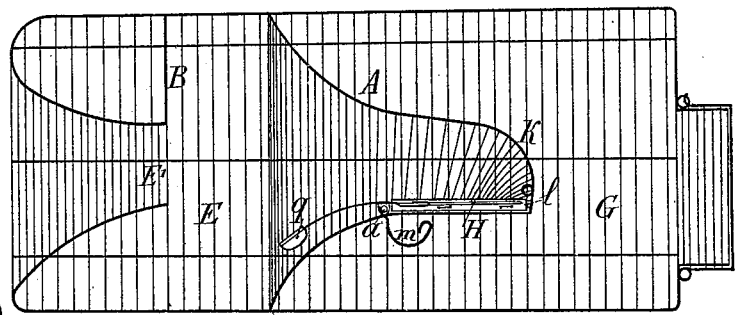
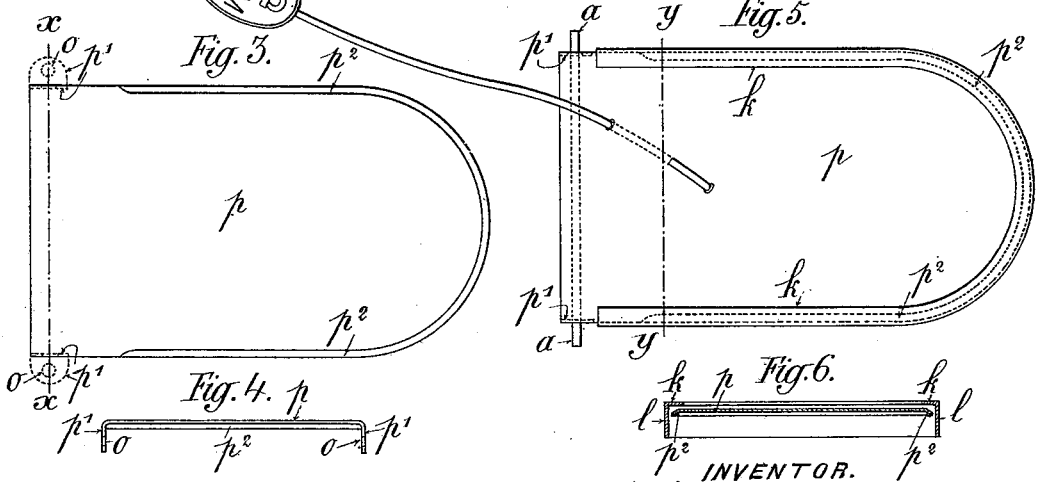
WITNESSES.
Albert Jones.
Christopher S. Parker.
INVENTOR.
Henri Marty
By his Attorneys.
Wheatley & MacKenzie

UNITED STATES PATENT OFFICE.

HENRI MARTY, OF VILLEFRANCHE DE ROUERGUE, FRANCE.

ANIMAL-TRAP.

SPECIFICATION forming part of Letters Patent No. 643,669, dated February 20, 1900.

Application filed December 28, 1897. Serial No. 664,036. (No model.)

*To all whom it may concern:*

Be it known that I, HENRI MARTY, a citizen of the Republic of France, residing at Villefranche de Rouergue, Aveyron, in the Republic of France, have invented certain new and useful Improvements in Rat-Traps, (for which I have obtained Letters Patent in France, No. 268,135, dated June 23, 1897;) and I do hereby declare the following to be a full, clear, and exact description of the invention, such as will enable others skilled in the art to which it appertains to make and use the same.

This invention relates to improvements in the construction of rat-traps of the kind described in my Patent No. 290,082, dated December 11, 1883—that is to say, of traps formed of a chamber the outer wall of which is made of wirework and is divided by means of a wirework partition into two compartments, which communicate with each other by an oscillating trap-door, affording a passage for the animal intended to be caught.

The improvements which constitute the subject of this invention are relative to the construction of the trap-door and its frame, their object being to prevent the imprisoned animal from opening this trap-door in order to escape, which sometimes happened in the case of the original construction given to the trap-door forming the subject of the Patent No. 290,082.

In order that this invention may be thoroughly understood, it is represented in the accompanying drawings, in which—

Figure 1 shows such trap to which these improvements are applied in longitudinal section. Fig. 2 is a detail view representing, on a larger scale, the improvement in the construction of the small cage, serving to lead the animal upon the trap-door. The chain-dotted lines represent this trap-door and its flexible temporary support at the moment of its opening under the action of the weight of the animal. Fig. 3 is a plan, and Fig. 4 a cross-section, on line $xx$ of Fig. 3, showing the improvement in the construction of the trap-door. Fig. 5 represents the combination of the trap-door with its frame, and Fig. 6 shows these parts in cross-section on line $yy$.

In the figures similar letters refer to similar parts.

This trap, formed of a wirework chamber, is divided into two compartments—one, E, termed the "inlet-chamber" and the other, G, termed the "cell"—by means of a truncated conical wirework partition A, at the apex of which a small cage K is provided, which serves to lead the animal upon the oscillating trap door H, through which communication is established between the compartments E and G. One of the improvements applied to the construction of this chamber consists in the arrangement of a flat wirework partition B, which starts from the orifice E′ of the inlet-chamber E and terminates at the side walls and at the top of the chamber. This partition-wall serves to deceive the animal, which would be tempted to again leave the compartment E and to induce the same to take its way in direction of the bottom of the funnel A.

The trap-door H is always constructed in shape of an oscillating metal plate $p$, to which a counterweight $q$ is attached. The pivot of this trap-door is, however, so adjusted that its action can always be relied upon, even when the pivot-bolt of the door itself should become rusty. For this purpose the trap-door, cut out of a metal plate, is made in one piece with lugs or ears $p'$, pierced with holes $o$ slightly larger in diameter than that of the pivot $a$. The ears or lugs $p'$ are subsequently bent down perpendicularly to the plane $p$ of the trap-door in such a manner that the pivot $a$, which is fixed onto the wirework walls of the small cage K, supports the trap-door exclusively by its passing through the holes $o$, so that, supposing this pivot to have become rusty, it cannot impede the oscillating movements of the trap-door $p$. The edges of the trap-door are slightly turned down at $p^2$ all along that portion which will bear against the corner iron $k\,l$, forming the seat of the trap-door. This frame is formed by an angle-iron with vertical flange $l$ and horizontal flange $k$. The flange $l$ is hooked or sewed at $h$ onto the bottom edge of the wirework of the small cage K. Owing to the bulge $p^2$ of the trap-door, the latter is enabled to freely oscillate without coming in contact with the seams $h$. As the animal imprisoned in the cell G is prevented from passing its claws between the flange $l$ of the frame and the bulged edge $p^2$ of the trap-door, it will not succeed in lowering the latter, since the weight $q$ retains the same constantly in contact with the seat $k$ up to the moment when another animal passing over the trap-door causes the same to again oscillate.

In order that the trap-door may constantly remain under the influence of the weight $q$ after the animal has been precipitated into the cell, a flexible hook $m$, formed by the end of one of the ribs $n$ of the wirework of the chamber, is arranged beneath and at a small distance from the trap-door, so as to yield slightly and without concussion under the pressure transmitted to it by the trap-door charged with the animal and to immediately return this trap-door in an upward direction as soon as the animal has rushed into the cell, whereupon the counterweight $q$ again applies the door against its seat $k$.

What I claim, and desire to secure by Letters Patent, is—

1. In a rat-trap, the combination with a wirework chamber, a truncated conical wirework partition A dividing the interior of the chamber into two compartments, and shaped to form a cage K at the apex of said partition, of a trap-door controlling communication between said compartments as described, said door being composed of a metal plate provided at one end with turned-down ears $p'$ having holes and having turned-down edges $p^2$, a pivot carried by the cage K and passing through the holes, the latter being somewhat larger in diameter than the pivot, a counterweight carried by the door, an angle-iron carried by the cage and forming a seat for the trap-door, and being composed of a vertical flange $l$ and a horizontal flange $k$ against which latter flange the trap-door is normally pressed, the said flange $l$ being secured to the bottom edge of the cage K, all arranged substantially as and for the purpose specified.

2. In a rat-trap, the combination with a wirework chamber, a truncated conical wirework partition A dividing the interior of the chamber into two compartments, and shaped to form a cage K at the apex of said partition, of a trap-door controlling communication between said compartments as described, said door being composed of a metal plate provided at one end with turned-down ears $p'$ having holes and having turned-down edges $p^2$, a pivot carried by the cage K and passing through the holes, the latter being somewhat larger in diameter than the pivot, a counterweight carried by the door, an angle-iron carried by the cage and forming a seat for the trap-door, and being composed of a vertical flange $l$ and a horizontal flange $k$ against which latter flange the trap-door is normally pressed, the said flange $l$ being secured to the bottom of the cage K, and a flexible hook $m$ formed integral with the wirework of the partition A and adapted to be struck by the trap-door after the latter has been tilted somewhat downwardly and adapted to operate as described.

In testimony whereof I have affixed my signature in presence of two witnesses.

HENRI MARTY.

Witnesses:
ALBERT MAULVAULT,
EMILE PRESELUS.